United States Patent [19]

Janssen et al.

[11] 4,274,941
[45] Jun. 23, 1981

[54] PROCESS FOR GENERATING COMBUSTIBLE GASES, LIQUID COAL BYPRODUCTS AND SUPERHEATED STEAM FROM COAL

[75] Inventors: Klaus Janssen, Essen; Werner Peters, Wattenscheid; Hans-Dieter Schilling, Hattingen, all of Fed. Rep. of Germany

[73] Assignee: Bergwerksverband GmbH, Essen, Fed. Rep. of Germany

[21] Appl. No.: 620,772

[22] Filed: Oct. 8, 1975

[30] Foreign Application Priority Data

Oct. 10, 1974 [DE] Fed. Rep. of Germany ....... 2448354

[51] Int. Cl.$^3$ .................... C10G 1/00; C10J 3/00; C10B 47/00; C10B 47/24
[52] U.S. Cl. ..................... 208/8 R; 48/210; 201/12; 201/16; 201/31; 202/133; 202/137
[58] Field of Search ................ 208/8; 48/210; 201/12, 201/16, 31; 202/133, 137

[56] References Cited

U.S. PATENT DOCUMENTS

| 2,544,843 | 3/1951 | Leffer | 208/8 |
|---|---|---|---|
| 2,557,680 | 6/1951 | Odell | 201/12 |
| 2,588,075 | 3/1952 | Barr et al. | 201/12 |
| 2,608,526 | 8/1952 | Rex | 208/8 |
| 2,634,198 | 4/1953 | Kalbach | 201/16 |
| 2,741,549 | 4/1956 | Russell | 208/8 |
| 2,985,515 | 5/1961 | McKinley | 48/197 R |
| 3,565,766 | 2/1971 | Eddinger et al. | 208/8 |
| 3,839,186 | 10/1974 | Berger | 208/8 |
| 3,841,991 | 10/1974 | Cohen et al. | 208/8 |
| 3,855,070 | 12/1974 | Squires | 208/8 |

Primary Examiner—W. J. Shine
Assistant Examiner—William G. Wright
Attorney, Agent, or Firm—Michael J. Striker

[57] ABSTRACT

Fine grained coal is fed into a first chamber of a generally horizontally extending fluidizing bed reactor while a stream of hot solid heat exchange material is passed through the chamber. The coal is then subjected to a fluidizing action with a low nitrogen and low oxygen content so as to degas the coal particles and obtain the combustible gases and liquid byproducts. The coke particles thus formed are then passed into an adjoining second chamber which acts as the combustion chamber and are subjected therein to fluidization with air and burning. Steam is generated in water-filled conduits passing through said second chamber. The heat exchanger particles are simultaneously heated up and are continuously fed back into the first zone of the reactor to contact fresh coal introduced thereinto.

10 Claims, 3 Drawing Figures

PROCESS FOR GENERATING COMBUSTIBLE GASES, LIQUID COAL BYPRODUCTS AND SUPERHEATED STEAM FROM COAL

BACKGROUND OF THE INVENTION

The invention relates to a process and apparatus for obtaining combustible gases, liquid byproducts and superheated steam from coal in a compact fluidizing bed reactor.

It is known to burn coal in a fluidizing bed boiler system in order to generate steam. The combustion can be operated with up to 25 bar pressure in the furnace (German Pat. No. 973,248, Papers of Third International Protection Agency October/November 1972).

The shortcoming of these known fluidizing bed furnaces is that a uniform distribution of the fuel across the entire cross-section of the fluidizing bed is only possible by means of a uniform distribution of a multitude of fuel inlets above the inlet face of the fluidizing bed. Besides in this process there are lost the liquid byproducts such as tar and benzene.

There are furthermore fluidizing bed reactors known in which a flow of fluidized solid particles is caused to occur in horizontal direction by means of a slight downgrade extending from the inlet of the solid particles to the outlet in the reactors. (Glückauf-Forschungshefte 26 (1965), No. 2, pages 67/68).

It is therefore an object of the present invention to obtain combustible gases, liquid byproducts and superheated steam from coal in a compact fluidizing bed reactor in a continuous process in order to obtain energy from the coal without loosing the valuable liquid byproducts. It is a further object to carry out the entire process in a single self-contained and technologically uniform apparatus.

SUMMARY OF THE INVENTION

These and other objects are obtained by charging fine grain sized coal into a first zone of a fluidizing bed reactor while passing a stream of hot solid heat exchange materials through the reactor. The coal is subjected in the first zone of the reactor to a fluidizing action with a low nitrogen and low oxygen gas and the coal is thus degassed and combustible gases and liquid byproducts are formed which can be recovered. The coke formed in the degassing zone is then passed into a second zone acting as a combustion zone and is subjected there to fluidization with air and burning. At the same time steam is generated by the combustion action in water-filled conduits passing through said chamber. Simultaneously the heat exchange particles are heated up and are continuously fed back into the first zone of the reactor where they are brought into contact with the fresh coal introduced therein.

The invention also embraces an apparatus for carrying out the process. The apparatus comprises an elongated generally horizontally extending vessel constituting a fluidizing bed reactor, a syphon system forming inlet openings to said vessel and dividing it into two adjoining fluidizing bed channels which constitute a first degassing and second combustion chamber. Feedback means are provided from the remote end of the second chamber to the inlet end of the first chamber and means are associated with the degassing chamber for removing, purifying, and backfeeding the gases formed therein. Means are also provided in the combustion chamber for generating steam and removing the fluid gases rising in said chamber.

DISCUSSION OF THE INVENTION AND DESCRIPTION OF PREFERRED EMBODIMENTS

The practical use of the products obtained in the invention such as the combustible gases which are released, the liquid byproducts and the superheated steam as well as the flue gases arising from the combustion zone is a matter of individual discretion. It is however advisable to feed back the degassing gases from the first chamber, if desired, after removal of dust and liquid byproducts, in circulating the gases via a gas pump back into the first chamber. This circulation will serve to augment the combustible gas obtained in the first chamber. Part of this gas must therefore be removed continuously from the circulation.

The fluidization of the fresh coal in the first chamber can also be effected totally or partly by means of superheated steam. Thus a certain gasifying of the coal in the first chamber will take place along with the degasifying action.

The flue gases which rise from the second chamber can be particularly usefully employed for energy purposes if the reactor is operated at a higher pressure for instance of 10 or 25 bar or even higher. The flue gases must in this case be discharged through a gas turbine in order to make use of their energy.

One of the principal advantages of the present invention is the fact that because of the heating of the fresh coal by means of high temperature ashes, a producer gas can be obtained during the conversion of the fresh coal into fine grained coke. This producer gas in itself is a valuable combustible gas. In the processes of the prior art where the coal was heated only by part combustion, this stage of the process resulted only in an inferior and hardly useful gas.

For carrying out the process ashes and coal are intermixed in the first chamber of the reactor through the turbulence due to the fluidization. After being degassed they can then be passed into the second chamber of the reactor by means of one or several syphons. The ashes which may occur at this stage of the process in the second chamber are then likewise fed back through a syphon system into the first chamber.

The horizontal circulation of the fuel-heat exchange mixture in the fluidizing bed reactor is maintained by introducing gases into the syphon systems. This will cause the partition walls between the chambers to become permeable for the solid materials while the walls remain largely impermeable for the fluidizing gases introduced into the individual chambers.

Figure 1:
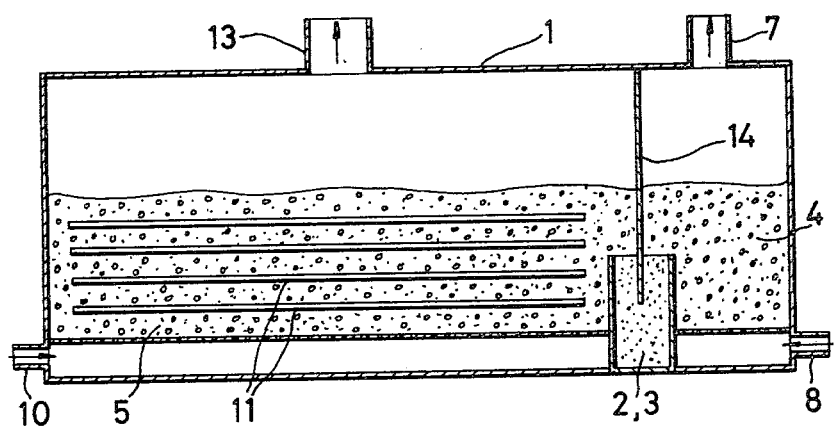
FIG. 1 is a schematic illustration of the fluidizing bed reactor in cross section.
Figure 2:
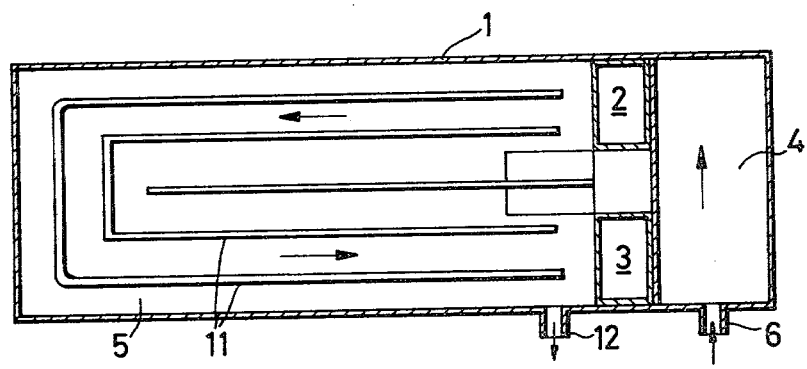
FIG. 2 is a plan view of the device shown in FIG. 1.

With reference now to FIGS. 1 and 2 of the drawings it will be seen that the fluidizing bed reactor comprises an elongated generally horizontally directed vessel 1 which is subdivided by two syphon systems 2 and 3 into two channel type fluidizing bed chambers 4 and 5. The end of the second chamber 5 for the combustion operation is connected with the feed-in point of the first chamber 4 which forms the degasifying zone. Both chambers 4 and 5 are separated by the syphon systems 2 and 3 in a more or less gas-tight manner.

In the first chamber 4 there may for instance be mixed 50 t/h of a fine grain size coal containing a fraction of between 30 and 40% of volatile components and having a grain size up to 6 mm with 150 t/h of hot solid ashes. The coal is introduced into the chamber 4 by the tube 6 by means of a steam-operated pneumatic feeding device. The ashes enter the first chamber 4 through the syphon 3 at a temperature of about 800° C. By introducing the fine grain coal into the chamber 4 a mixing temperature of 450° to 600° C. is obtained. There are thus formed about 10 t/h of crude gas which through a producer gas outlet 7 can be passed into a gas purification and if desired gas separation device. There are thus obtained about 6.5 t/h of tar and benzene as well as 3.5 t/h of coke oven gas of a high caloric value. As already mentioned the fluidization of the solid materials in the chamber 4 is effected by means of the crude gas which is formed in the degasifying zone and is fed back through the tube 8 and is fully or partially separated before from the liquid coal byproducts.

The low temperature coke in an amount of about 40 t/h which remains after the degasifying operation is passed with the 150 t/h heat exchangers via the syphon 2 into the chamber 5. The mixture is there completely burned by means of air introduced through the tube 10 and having a temperature for instance of about 400° C. The heat released in the combustion is largely transferred to the boiler tubes 11 for the purpose of steam generation. These tubes enter the fluidization area of the combustion zone.

Part of the heat of combustion is used up for heating the ashes which are then transferred via the syphon 3 into the chamber 4. Excess ashes are withdrawn from the combustion zone of the chamber 5 via a drain 12.

The flue gas leaves the chamber 5 via the tube 13 at a temperature of about 800° to 900° C. This gas is passed to convection heat exchangers for generation of steam, feed water or air heating. It finally ends up via a dust separator in the stack.

If the fluidization bed reactor is operated at a pressure of for instance 10 or 25 or also 45 bar it is possible to employ the pressure of the hot fluid gases in a waste gas turbine. The steam generation of this example is sufficient to produce an electric performance of about 100 MWel.

Figure 3:
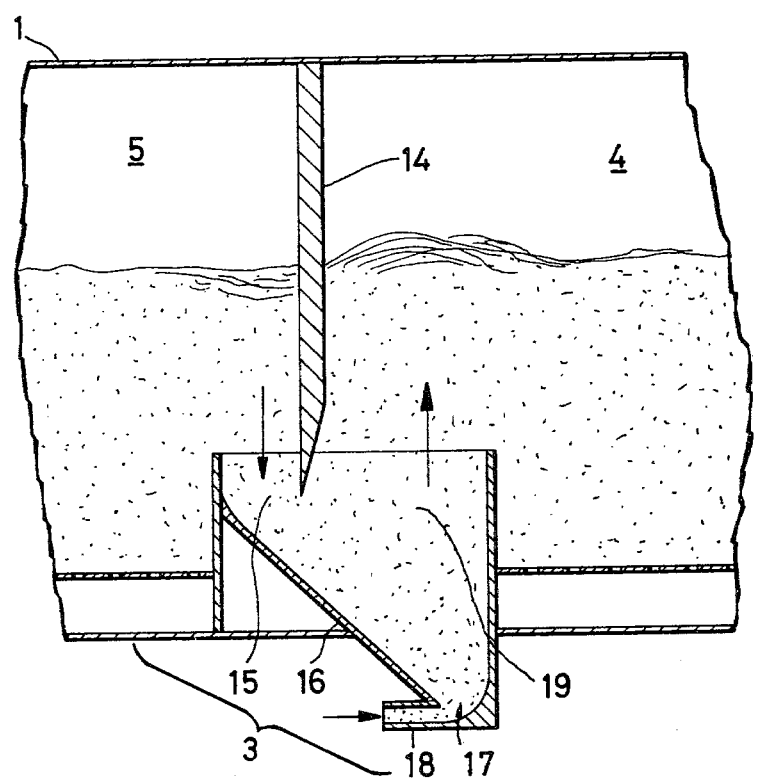
FIG. 3 is an enlarged diagrammatic illustration of the syphon system in cross section.

With reference to FIG. 3 it will be seen that the syphon 3 connects the chamber 5 with the chamber 4 and that both chambers are separated against each other by the partition wall 14. The ash in this case enters through the inlet duct 15 into the syphon 3. It then slides across the slanting syphon floor 16 towards the nozzle ledge 17. A syphon propelling gas is blown in through the tube 18. Preferably the propelling gas consists of steam in case of syphon 3. The solid material is fluidized upon strong bubble formation and is carried into the exit channel 19 with the rising gas bubbles. The downflow of the ashes in the inlet channel 15 and the horizontal spacing between the inlet channel 15 and the horizontally arranged nozzle ledge 17 prevents the formation of a retrograde gas flow into the fluidizing chamber 5.

At a pressure difference up to 0.03 bar and preferably not more than 0.01 bar between the chambers 4 and 5 a perfect operation of the fluidizing bed reactor is possible without incurring the risk of an undesired gas flow from one chamber into the other. The speed of circulation of the ashes in the reactor can be adjusted according to the diameter of the syphon inlet shafts, the arrangement of the slanting syphon floors and the amounts of gases entering through the nozzle ledges.

One of the principal advantages obtained with the apparatus of the invention is found in the fact that the degasifying and/or gasifying of the coal and the burning of the obtained coke can be carried out in a single fluidizing bed reactor. Thus, long conveyor lines for the coke from one device to the other are unnecessary. Besides, the manner of subdividing the fluidizing bed reactor in two fluidizing bed chambers disposed on the same plane makes it possible to easily adjust the times of residence of the fuels in the several chambers, as well as to bring these times in accord with the particular coal employed.

An important advantage is also that the introduction of fresh coal and the withdrawal of products can be effected at any desired place of the fluidizing bed reactor, since it is easy to arrange accordingly the inlet and discharge ducts. The syphon systems besides permit a separate flow of the gases in each of the fluidizing bed chambers and accordingly also a separate treatment of the produced gases.

A still further advantage of the reactor lies in the fact that no mechanically movable parts are necessary in the area of hot zones. Required control devices can easily be arranged in areas where there is no, or only slight, heat impact. It is only necessary that all fluidizing bed chambers are operated with approximately the same gas pressure in order not to interfere with the action of the syphon systems.

Finally, the simplicity of the construction of the reactor permits the arrangement of additional inlet and outlet ducts for material. An additional duct in the second chamber can for instance be used for introducing lime which may be used to react with and hold the sulfur dioxide which may be formed in the combustion. It is thus possible to obtain in the discharge from the second chamber a flue gas which is already purified from deleterious components.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for obtaining combustible gas and liquid byproducts from coal and generating steam by the combustion of the coal, the process comprising
    (a) charging fine grain size coal into a degasifying first zone of a single generally horizontal fluidizing bed reactor while introducing into said degasifying zone a stream of hot solid ash particles acting as heat exchange particles;
    (b) subjecting the coal in said degasifying zone to a fluidizing action at a temperature of about 450° to 600° C. whereby the coal particles are degassed and part of the combustion gas and liquid byproducts formed thereby may be recovered;
    (c) passing the fluidized coke particles formed in said degasifying zone together with the hot ash particles into an adjoining second zone of the reactor acting as a combustion zone, the two zones being separated by a vertical partition wall, the step of passing comprising using a first syphon means comprised of a shorter inlet portion communicating with said degasifying zone, a longer outlet portion communicating with said combustion zone and a slanting intermediate portion slanting downwardly from the bottom of the inlet portion to the bottom of the outlet portion, the outlet portion being located to the same side of said partition wall as is said second zone, the outlet portion extending vertically upwards from the bottom of the slanting intermediate portion up into said second zone, and introducing a propelling gas into the outlet portion at a location which is at the bottom of the outlet portion and which is located to the same side of said partition wall as is said second zone, to cause coke and ash particles in the degasifying zone to descend along the slanting intermediate portion under the force of gravity and be impelled upwards through the outlet portion to the top of the outlet portion and thereby enter said combustion zone;

(d) subjecting the coke particles in said combustion zone to fluidization with hot air and burning at a temperature of about 800° to 900° C. to effect the formation of additional ash particles and causing the heat of combustion produced in said combustion zone to be utilized for heating or steam generation purposes;

(e) continuously withdrawing hot ash particles from said combustion zone and feeding them back into said degasifying zone in order to provide said hot ash particles at (a) which are brought into contact with the charges of fresh coal, so as to heat up the coal particles and support their fluidization, the step of withdrawing comprising using a second syphon means comprised of a shorter inlet portion communicating with said combustion zone, a longer outlet portion communicating with said degasifying zone and a slanting intermediate portion slanting downwardly from the bottom of the inlet portion to the bottom of the outlet portion of said second syphon means, the outlet portion being located to the same side of said partition wall as is the first zone, the outlet portion extending vertically upwards from the bottom of the slanting intermediate portion up into said first zone, and introducing a propelling gas into the outlet portion of said second syphon means at a location which is at the bottom of the outlet portion and which is located to the same side of said partition wall as is said first zone, to cause hot ash particles in said combustion zone to descend along the slanting intermediate portion of said second syphon means under the force of gravity and be impelled upwards through the outlet portion to the top of the outlet portion of the second syphon means and thereby enter said degasifying zone, the steps of passing and withdrawing comprising maintaining the pressures in the two zones sufficiently uniform to permit the flow of fluidized coke and heat exchange particles from said degasifying zone through said first syphon means into said combustion zone and the flow of hot ash particles from said combustion zone through said second syphon means into said degasifying zone, the steps of passing and withdrawing furthermore comprising maintaining the level of material in said degasifying zone and in said combustion zone higher than the inlet and outlet portions of said first and second syphon means in order to prevent gases located above the level of material in said degasifying zone from freely passing into said combustion zone and in order to prevent gases located above the level of material in said combustion zone from freely passing into said degasifying zone.

2. The process of claim 1 wherein the fluidization of the coal in said first zone is effected with steam.

3. The process of claim 1 wherein the fluidizing bed is operated with a gas pressure of 10 to 45 bar.

4. The process of claim 3 wherein the gas pressure is between 10 and 25 bar.

5. The process of claim 1 wherein between the different zones of the fluidizing bed reactor a differential pressure of at most 0.03 bar is maintained.

6. The process of claim 5 wherein the pressure difference is at most 0.01 bar.

7. The process of claim 1 wherein the coal particles have a grain size of 0.1 to 0.6 mm when fed into the degassing zone.

8. The process of claim 1 wherein the gases formed in said first zone are withdrawn for removal of liquid byproducts and dust therefrom and are then passed back into said first zone to at least partly effect the fluidization of the coal particles.

9. The process of claim 1 wherein the pressure from the flue gases generated in the combustion zone is employed for driving an exhaust gas turbine.

10. The process of claim 1 wherein the propelling gas is steam.

* * * * *